(12) United States Patent
MacDonald et al.

(10) Patent No.: US 12,523,455 B2
(45) Date of Patent: Jan. 13, 2026

(54) SUBMUNITION DEPLOYMENT SYSTEM

(71) Applicant: Raytheon Company, Arlington, VA (US)

(72) Inventors: Paul S. MacDonald, Tiverton, RI (US); Jaylan S. Jones, Tucson, AZ (US); Jessie A. Polanco, Tucson, AZ (US); Shawn P. Burke, Omaha, NE (US)

(73) Assignee: Raytheon Company, Arlington, VA (US)

( * ) Notice: Subject to any disclaimer, the term of this patent is extended or adjusted under 35 U.S.C. 154(b) by 0 days.

(21) Appl. No.: 18/731,889

(22) Filed: Jun. 3, 2024

(65) Prior Publication Data

US 2025/0369738 A1   Dec. 4, 2025

(51) Int. Cl.
  *F42B 12/60*  (2006.01)
  *F42B 12/62*  (2006.01)
  *F42B 15/01*  (2006.01)

(52) U.S. Cl.
  CPC ............. *F42B 12/62* (2013.01); *F42B 15/01* (2013.01)

(58) Field of Classification Search
  CPC .......... F42B 12/56; F42B 12/60; F42B 12/62
  See application file for complete search history.

(56) References Cited

U.S. PATENT DOCUMENTS

| | | | | |
|---|---|---|---|---|
| 2,599,555 A | * | 6/1952 | Hurt | F41A 9/27 89/33.17 |
| 2,634,656 A | * | 4/1953 | Woollens | B64D 1/04 89/1.51 |
| 2,975,676 A | * | 3/1961 | Butler | B64D 1/04 89/1.51 |
| 3,093,072 A | | 6/1963 | Pigman | |
| 4,172,407 A | * | 10/1979 | Wentink | F42B 12/60 102/480 |
| 4,208,949 A | * | 6/1980 | Boilsen | B64D 1/04 89/1.801 |
| 4,608,907 A | * | 9/1986 | Ellis | B64D 1/04 89/1.51 |
| 4,726,297 A | | 2/1988 | Bueno et al. | |
| 5,016,839 A | | 5/1991 | Frehaut et al. | |

(Continued)

FOREIGN PATENT DOCUMENTS

| | | |
|---|---|---|
| DE | 1232855 | 1/1967 |
| DE | 2920347 | 11/1982 |

(Continued)

OTHER PUBLICATIONS

EP 0049778 A1 Translation (1982).

(Continued)

*Primary Examiner* — Derrick R Morgan
(74) *Attorney, Agent, or Firm* — Schwegman Lundberg & Woessner, P.A.

(57) ABSTRACT

A payload module for an aerial vehicle stores and deploys one or more submunition assemblies, which provide a portion of the vehicle's OML when stored, in a manner that preserves the aerodynamics of the aerial vehicle post-deployment. Pre-deployment a skin is aligned to a strongback such that the submunition assemblies are exposed through openings in the skin. Post-deployment, the skin rotates to cover any openings in the strongback exposed by the deployment of the submunition assemblies to restore the OML.

20 Claims, 15 Drawing Sheets

(56) References Cited

U.S. PATENT DOCUMENTS

| | | | |
|---|---|---|---|
| 5,188,315 | A | 2/1993 | Foitzik et al. |
| 5,239,927 | A | 8/1993 | Frye et al. |
| 5,253,588 | A | 10/1993 | Vogt et al. |
| 5,386,781 | A | 2/1995 | Day |
| 5,760,330 | A | 6/1998 | Himmert et al. |
| 6,056,237 | A * | 5/2000 | Woodland ............... B64D 1/02 244/49 |
| 6,082,675 | A | 7/2000 | Woodall, Jr. et al. |
| 6,498,767 | B2 | 12/2002 | Carreiro |
| 6,626,400 | B1 | 9/2003 | Booth |
| 6,659,012 | B1 | 12/2003 | Grassl et al. |
| 6,672,220 | B2 | 1/2004 | Brooks et al. |
| 6,905,097 | B2 | 6/2005 | Blackwell-thompson et al. |
| 6,957,609 | B2 | 10/2005 | Ronn et al. |
| 7,032,521 | B2 | 4/2006 | Ronn et al. |
| 7,178,761 | B2 | 2/2007 | Wada et al. |
| 7,395,761 | B2 | 7/2008 | Bittle et al. |
| 7,494,089 | B2 | 2/2009 | Williams et al. |
| 7,908,973 | B2 | 3/2011 | De Lair et al. |
| 8,082,848 | B2 | 12/2011 | Hlavacek et al. |
| 8,708,285 | B1 * | 4/2014 | Carreiro ............... B64U 70/20 244/190 |
| 8,985,025 | B1 | 3/2015 | Manz et al. |
| 10,458,765 | B2 | 10/2019 | Hagberg et al. |
| 2007/0034073 | A1 * | 2/2007 | Banks ............... F42B 12/62 89/1.815 |
| 2022/0348327 | A1 | 11/2022 | Alley et al. |

FOREIGN PATENT DOCUMENTS

| | | |
|---|---|---|
| EP | 0049778 A1 | 4/1982 |
| EP | 1446629 B1 | 9/2010 |
| GB | 2392227 A | 2/2004 |
| WO | WO-2009022995 A2 | 2/2009 |
| WO | 2023239489 | 12/2023 |

OTHER PUBLICATIONS

"U.S. Appl. No. 18/731,968, Notice of Allowance mailed May 2, 2025", 8 pgs.

"International Application Serial No. PCT US2025 031886, International Search Report mailed Oct. 8, 2025", 3 pgs.

"International Application Serial No. PCT US2025 031886, Written Opinion mailed Oct. 8, 2025", 8 pgs.

"International Application Serial No. PCT US2025 031888, International Search Report mailed Oct. 8, 2025", 4 pgs.

"International Application Serial No. PCT US2025 031888, Written Opinion mailed Oct. 8, 2025", 7 pgs.

* cited by examiner

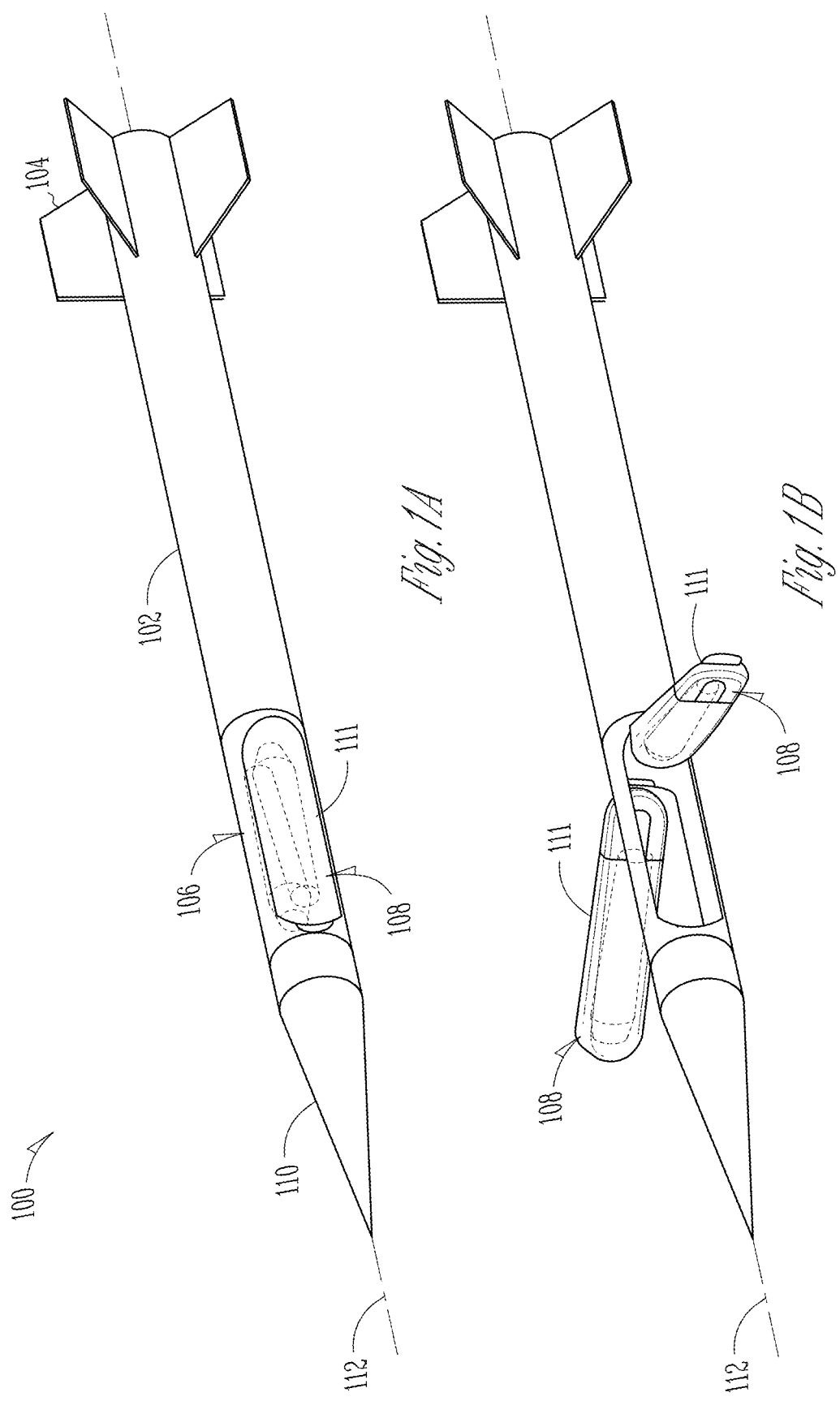

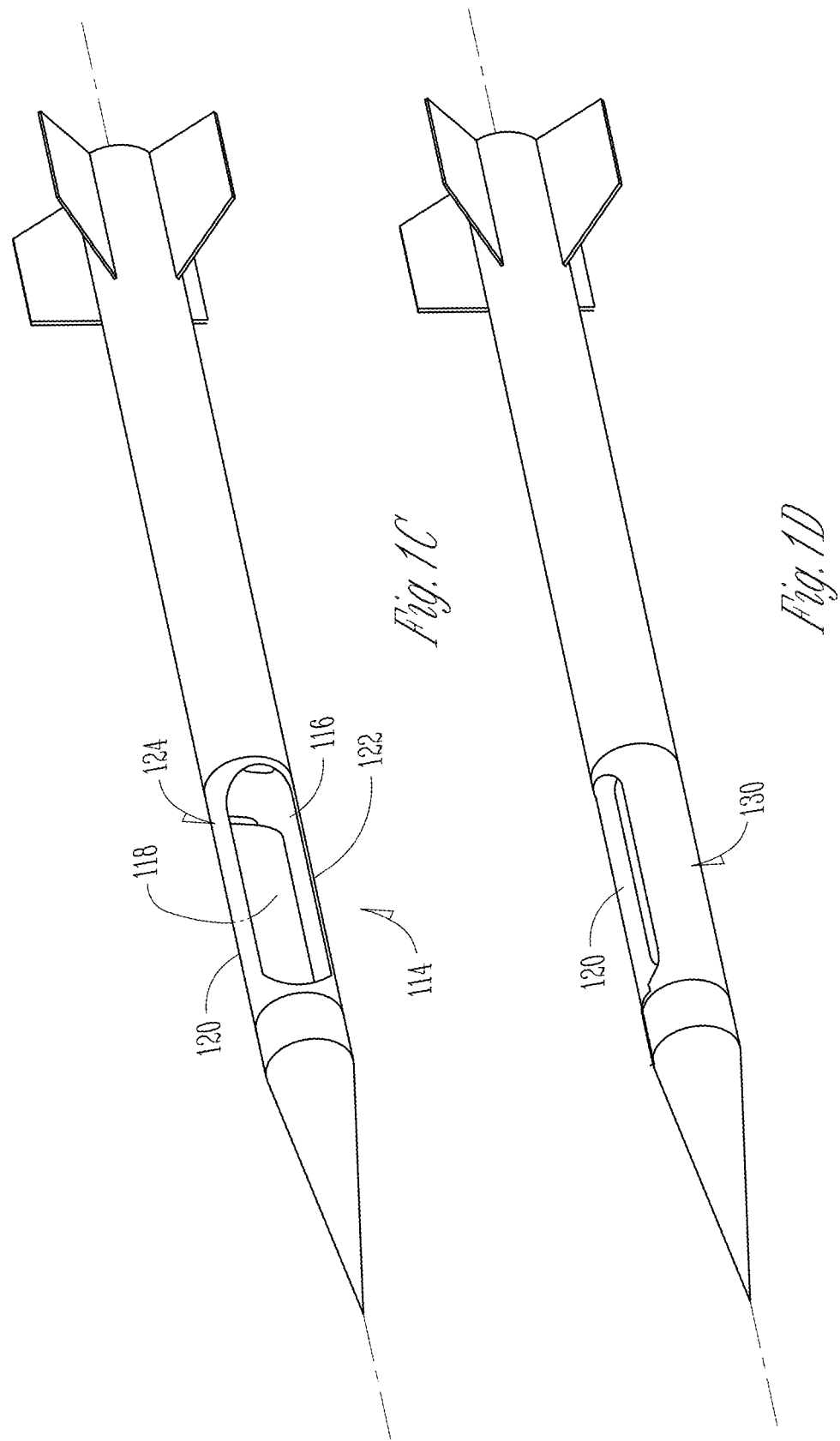

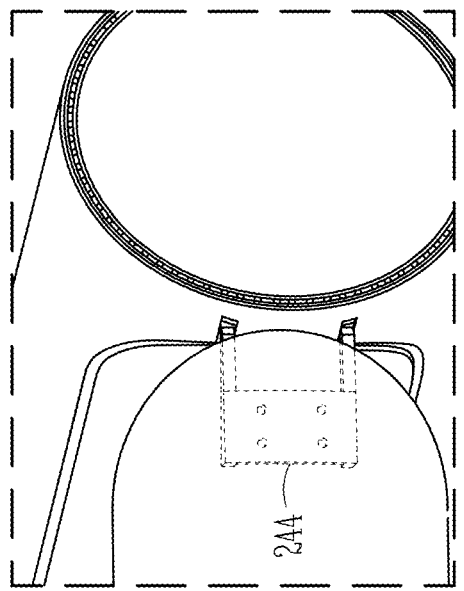
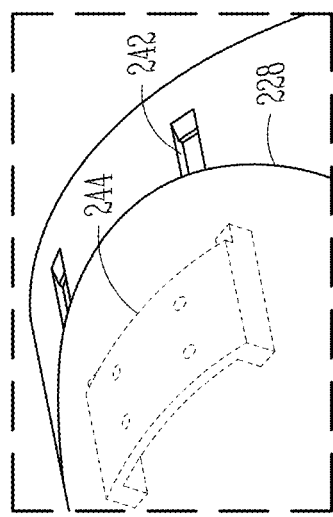
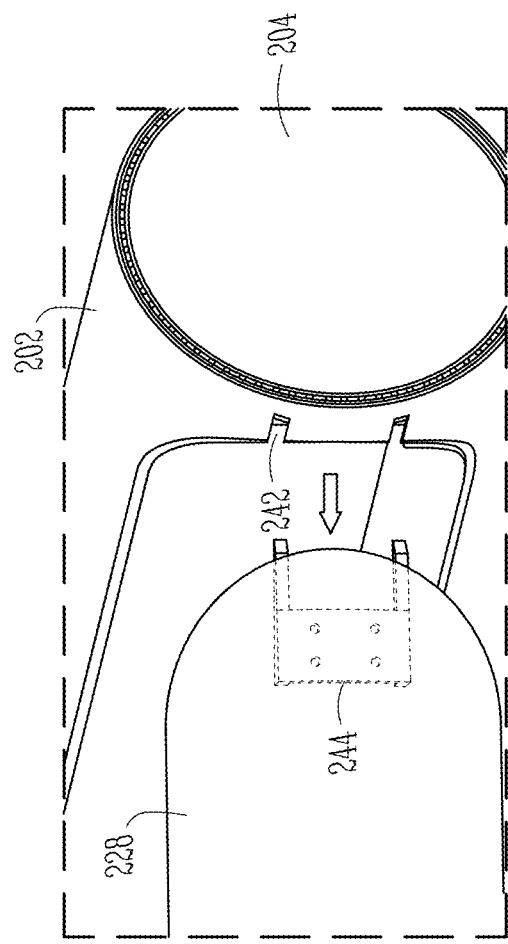

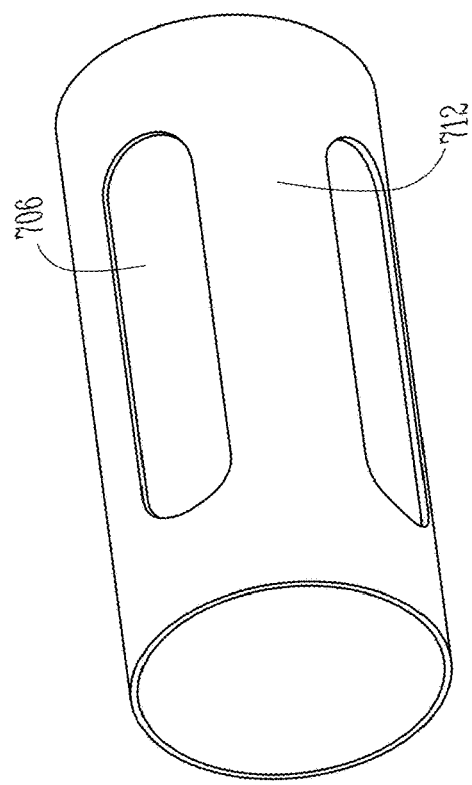
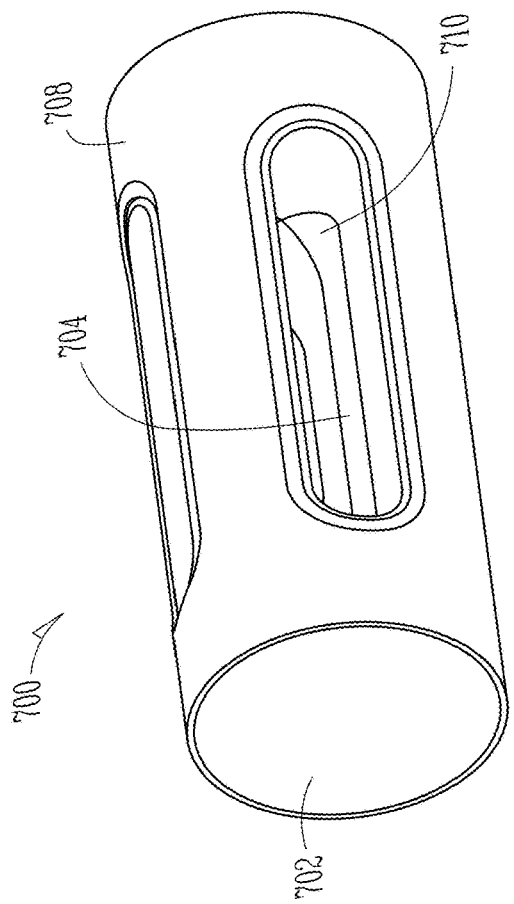

SUBMUNITION DEPLOYMENT SYSTEM

BACKGROUND

Field

This disclosure relates to deploying submunitions from an aerial vehicle, and particularly a supersonic vehicle such as a missile, in a manner that preserves the aerodynamics of the vehicle to allow the vehicle to continue flight.

Description of the Related Art

Aerial vehicles, typically missiles, unmanned aerial vehicles (UAVs) or the like, may be configured to deliver and deploy multiple submunitions into a theater of operations. The submunitions are stored within the aerial vehicle and then deployed at the desired time and location.

U.S. Pat. No. 6,056,237 entitled "Sonotube Compatible Unmanned Aerial Vehicle and System" issued May 2, 2000 discloses in reference to FIGS. 8-11 a rotary launcher assembly 31 designed to hold a plurality of payload packages 37 in separate compartments 210. The payload packages 37 are configured as generally cylindrical canisters. As a particular payload package is desired to be deployed, rotary launcher assembly 31 rotates the desired payload package into deployment position. Payload packages 37 are released through either one or all of the payload release doors 38, which are opened or closed by a pair of payload release door actuators 39.

U.S. Pat. No. 8,708,285 entitled "Micro-Unmanned Aerial Vehicle Deployment System" issued Apr. 29, 2014 discloses a micro-unmanned aerial vehicle deployment system for cruise missiles. Each of six submuntions compartments 14 can hold a submunition (MUAV) 20 that is separately ejectable from a payload module 12. The payload module comprises a shell 18 that provides environmental protection to the internal components and acts as a launch platform for MUAV's. Upon ejection of the payload module, a lanyard 30 pulls a closure door 62 (stored below the payload module) that rotates about a hinge 64 and latches to reform the conformal surface of the cruise missile. The lanyard 30 breaks leaving the payload module to fall and deploy a parachute. When the payload assembly 12 reaches a pre-programmed altitude, or on remote command, latches are fired thereby separating the walls of the shell 18 to release the MUAVs 20.

SUMMARY

The following is a summary that provides a basic understanding of some aspects of the disclosure. This summary is not intended to identify key or critical elements of the disclosure or to delineate the scope of the disclosure. Its sole purpose is to present some concepts of the disclosure in a simplified form as a prelude to the more detailed description and the defining claims that are presented later.

The present disclosure provides a payload module for an aerial vehicle that stores and deploys one or more submunition assemblies, which provide a portion of the vehicle's OML when stored, in a manner that preserves the aerodynamics of the aerial vehicle post-deployment. Pre-deployment a skin is aligned to a strongback such that the submunition assemblies are exposed through openings in the skin. Post-deployment, the skin rotates to cover any openings in the strongback exposed by the deployment of the submunition assemblies to restore the OML.

In an embodiment, a payload module includes a strongback having a cylindrical shape about an axis. At least one opening is formed in the strongback. A submunition assembly having a conformal surface is positioned inside the strongback within each opening. A skin also having a cylindrical shape is positioned about the axis outside the strongback. The skin has at least one opening and at least one panel formed therein. Each of the at least one opening and the at least one panel have sufficient area to cover the at least one opening in the strongback. A bearing assembly is configured to allow for rotation of the skin relative to the strongback about the axis. Pre-deployment the skin is aligned such that the at least one opening in the strongback and the conformal surface of the submunition positioned therein are exposed through the at least one opening in the skin such that the skin and conformal surface of the submunition assembly complete the OML. A deployment assembly is configured to deploy the at least one submunition assembly through the aligned openings in the strongback and skin. A rotation assembly is configured such that once the at least one submunition assembly clears the payload module, the rotation assembly rotates the skin relative to the strongback such that the at least one panel covers the at least one opening in the strongback and the exposed surfaces of the strongback and the skin complete the OML.

In different embodiments, the submunition assemblies and openings in the strongback and skin may be axial or radial as defined by a length/width ratio. The length being measured along the axis and the width across the axis. If the ratio is 1:1 or greater the opening is considered to be axial. In some embodiments the ratio is at least 2:1, 3:1 or even 20:1. If the ratio is less than 1:1 the opening is considered to be radial.

In an embodiment, the conformal surface of the submunition assembly extends through the opening in the strongback into the opening in the skin and level with the skin to complete the OML. Pre-deployment rotation is prevented by interference of the skin with the conformal surface of the at least one submunition assembly. The longitudinal edges of the opening in the skin are configured to interface with the conformal surface of the submunition assembly to complete the OML pre-deployment and to taper to the strongback post-deployment to complete the OML.

In an embodiment, an outer diameter of the strongback is at least 5 times a thickness of the skin.

In an embodiment, at least one panel of the strongback is pre-biased with a spring force such that post-deployment and rotation of the skin, the at least one panel moves outward into the at least one opening in the skin to complete the OML.

In an embodiment, the deployment assembly includes at least one spring positioned and pre-biased to exert an outward force on the submunition assembly and a locking unit to secure the submunition assembly. At deployment the locking unit releases the submunition assembly and the spring exerts the outward force on the submunition to deploy the submunition assembly through the aligned openings in the strongback and skin. In an embodiment, the locking unit includes a lock bracket having a receptacle on one end of the submunition assembly positioned forward in the opening in the strongback, a rod positioned to move into and out of the receptacle and an actuator configured to move the rod. In an embodiment, and in particular for axially-shaped assemblies, the deployment assembly includes a hinge bracket positioned aft in the opening in the strongback and a pivot bracket at one end of the submunition assembly below the conformal surface positioned aft in the opening in the strongback to engage the hinge bracket. At deployment, the submunition assembly pivots radially outward away from the strongback and separates from the hinge bracket. In an embodiment, and in particularly for radially-shaped assemblies, an actuator ejects the assembly away from the payload module.

In an embodiment, the rotation assembly including a rotational spring configured to pre-bias rotation of the skin relative to the strongback and rotate the skin once the at least one submunition assembly clears the payload module. In different embodiments, rotation of the skin is stopped via a hard stop or an equilibrium state of the rotational spring to align the skin's panel(s) to the opening(s) in the strongback to complete the OML.

In an embodiment, the submunition assembly includes a submunition of which at least a portion of its exterior surface provides the conformal surface.

In an embodiment, the submunition assembly includes a container having separable first and second walls that define a volume, at least a portion of one of the first and second walls have an exterior shape that provides the conformal surface of the submunition assembly, a submunition positioned within the volume inside the container, and a mechanism on the container to hold the first and second walls together to secure the volume and upon receipt of a command signal to separate the first and second walls to open the container and release the submunition. In an embodiment, the submunition includes a control unit configured to issue the command signal to the mechanism to open the container and release the submunition. The control unit includes a processor and memory to process data to issue the command signal. Any and all processors or memory or data stored in memory or processed by the processor resides only with the submunition. This is done so that post-release of the submunition, any and all components of the container that fall to Earth and may be recovered include no data or processing capabilities.

These and other features and advantages of the disclosure will be apparent to those skilled in the art from the following detailed description of preferred embodiments, taken together with the accompanying drawings, in which:

BRIEF DESCRIPTION OF THE DRAWINGS

FIGS. 1A-1D illustrate an embodiment of a payload module in a supersonic airframe configured to store multiple submunition assemblies that conform to the OML of the airframe, deploy the multiple submunition assemblies and rotate a skin to cover the openings left by the deployment of the submunition assemblies;

FIGS. 6A-6C illustrate an embodiment of a hinge assembly that pivots one end of the submunition assembly to release the submunition assembly;

FIGS. 7A and 7B illustrate an alternate embodiment of the payload module in which four submunition assemblies may be stored and deployed;

DETAILED DESCRIPTION

Figure 2A:
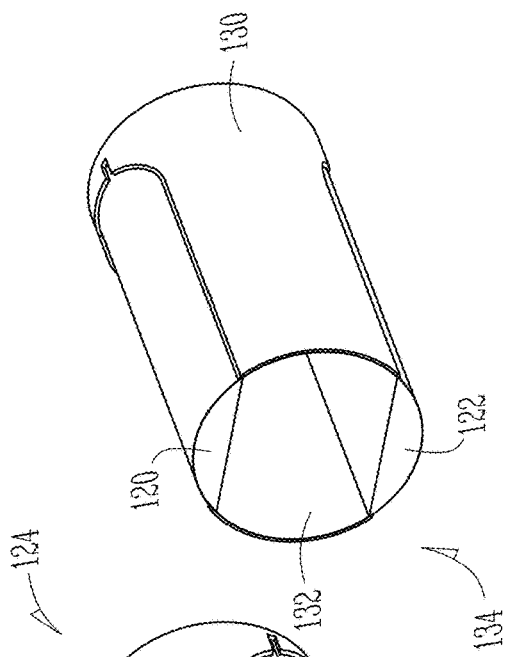
FIGS. 2A-2C illustrate a sequence of the skin pre-deployment, during rotation and after completing the OML of the strongback.
Figure 2B:
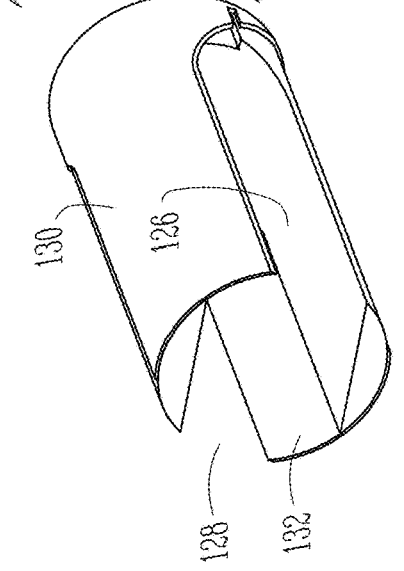
Figure 2C:
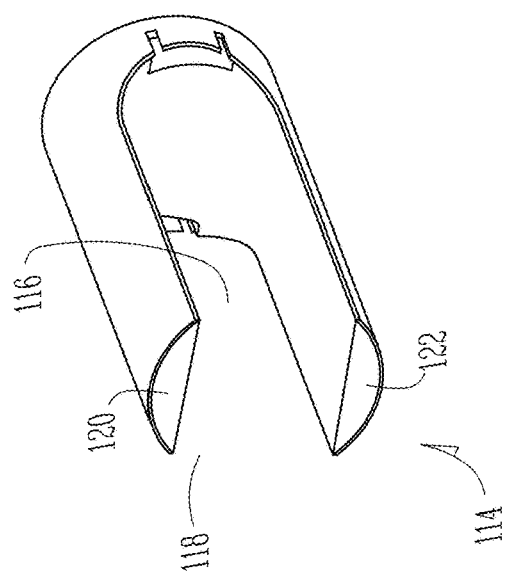
Figure 3B:
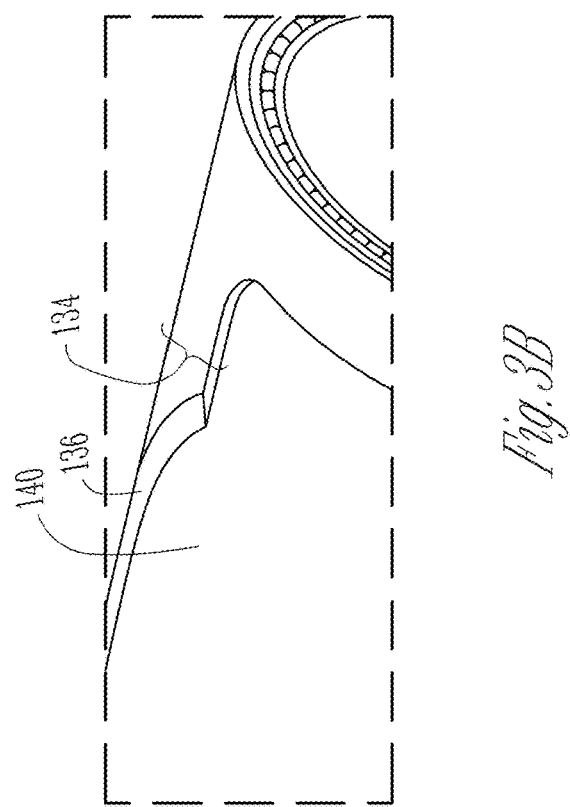
FIG. 3A-3B illustrate the interfaces between the skin and conformal surface of the submunition assembly and the rotated skin and strongback to complete the OML pre and post-deployment.
Figure 3A:
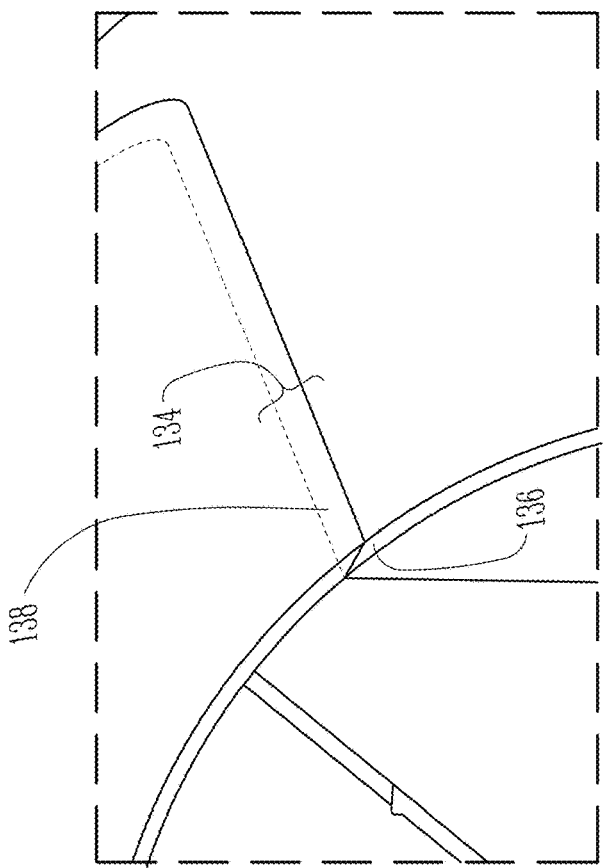
Figure 4A:
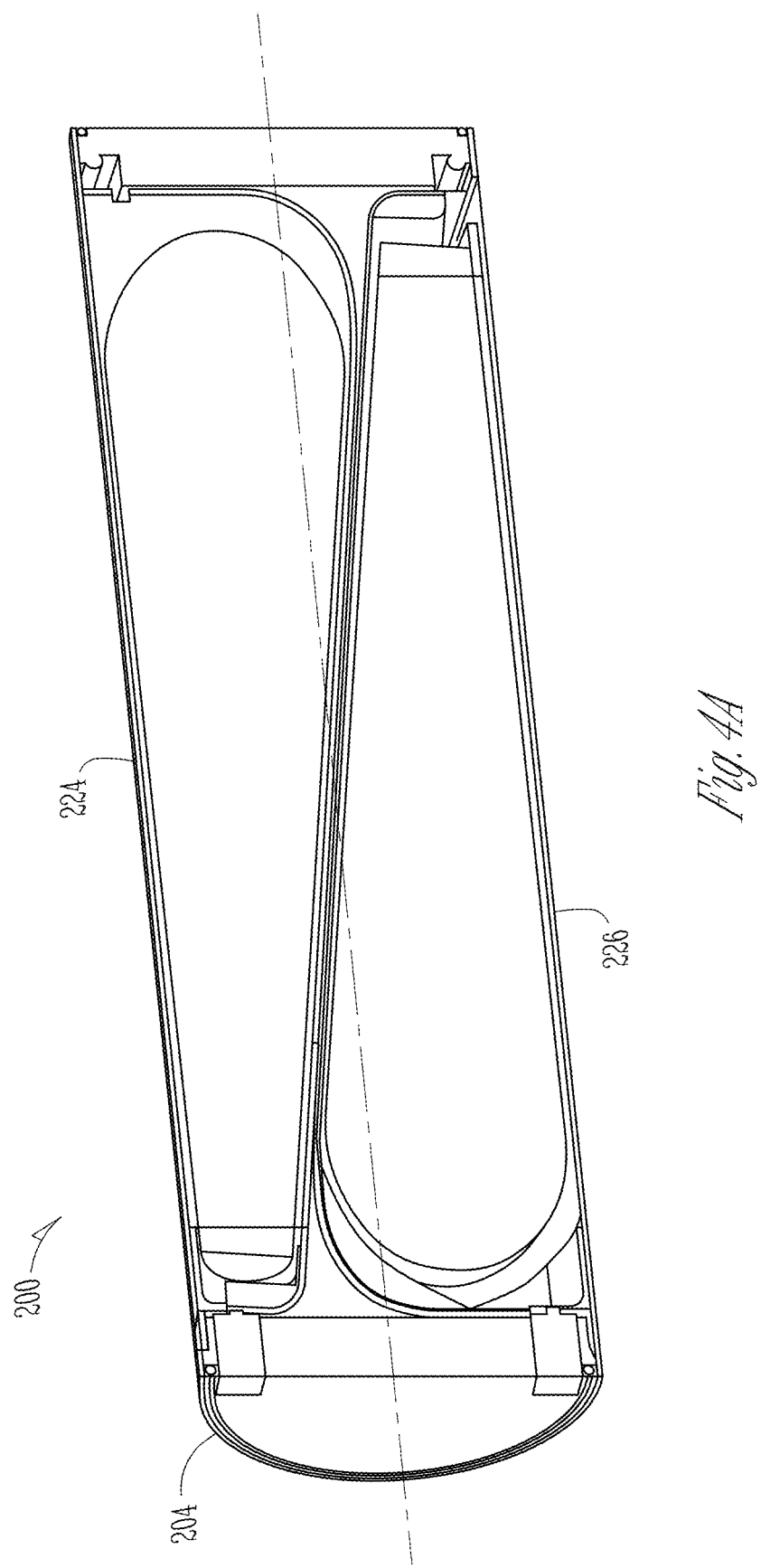
FIGS. 4A-4B are a section view and exploded view of an embodiment of the payload module.
Figure 4B:
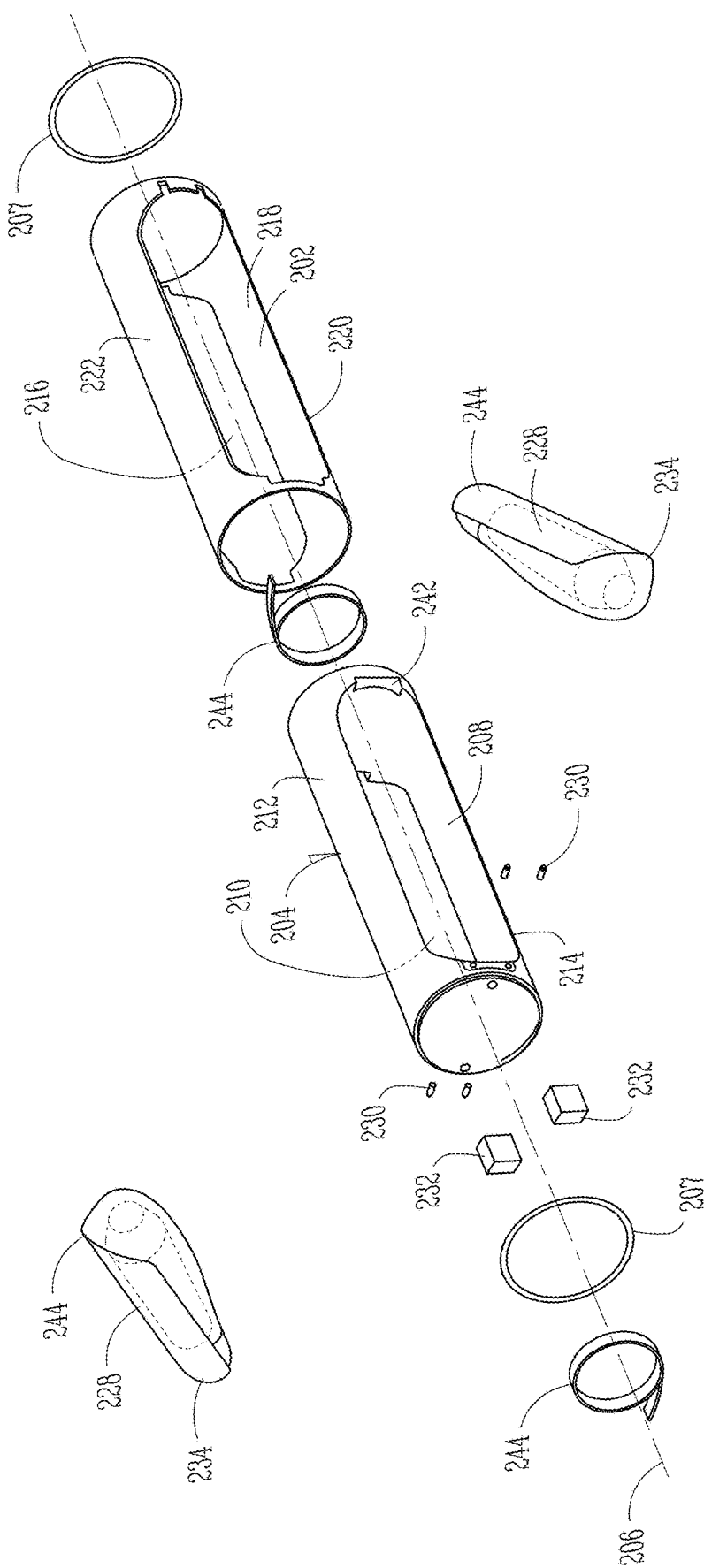
Figure 5A:
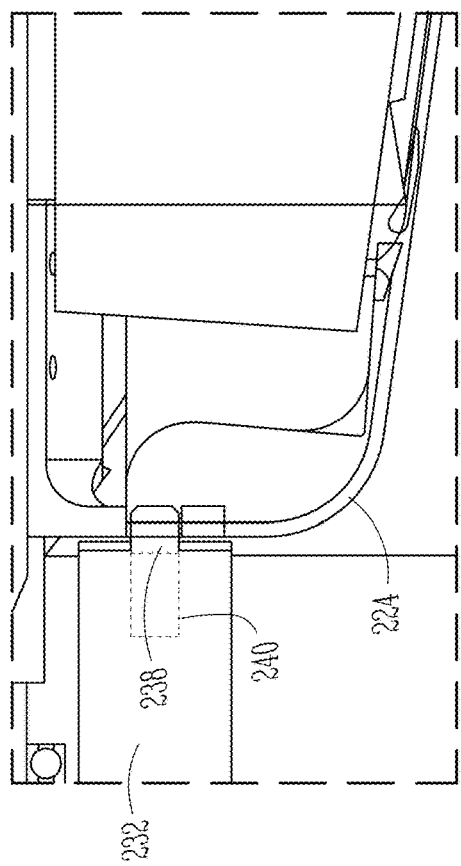
FIGS. 5A-5C illustrate an embodiment of a lock deploy unit and slotted spring plungers to hold and then deploy the submunition assemblies.
Figure 5B:
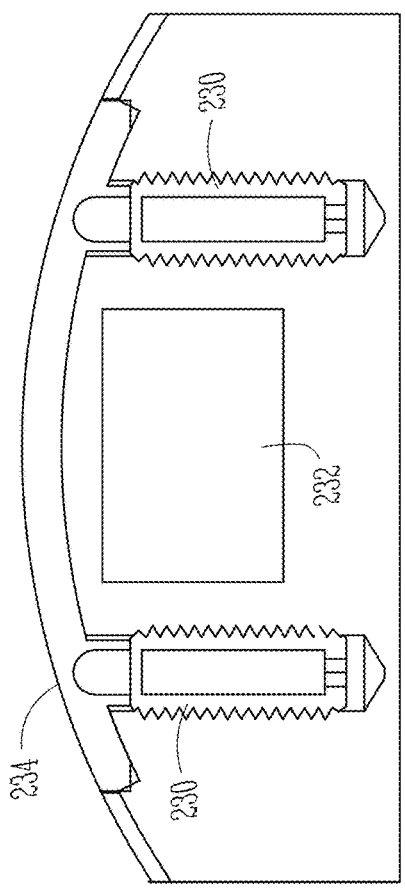
Figure 5C:
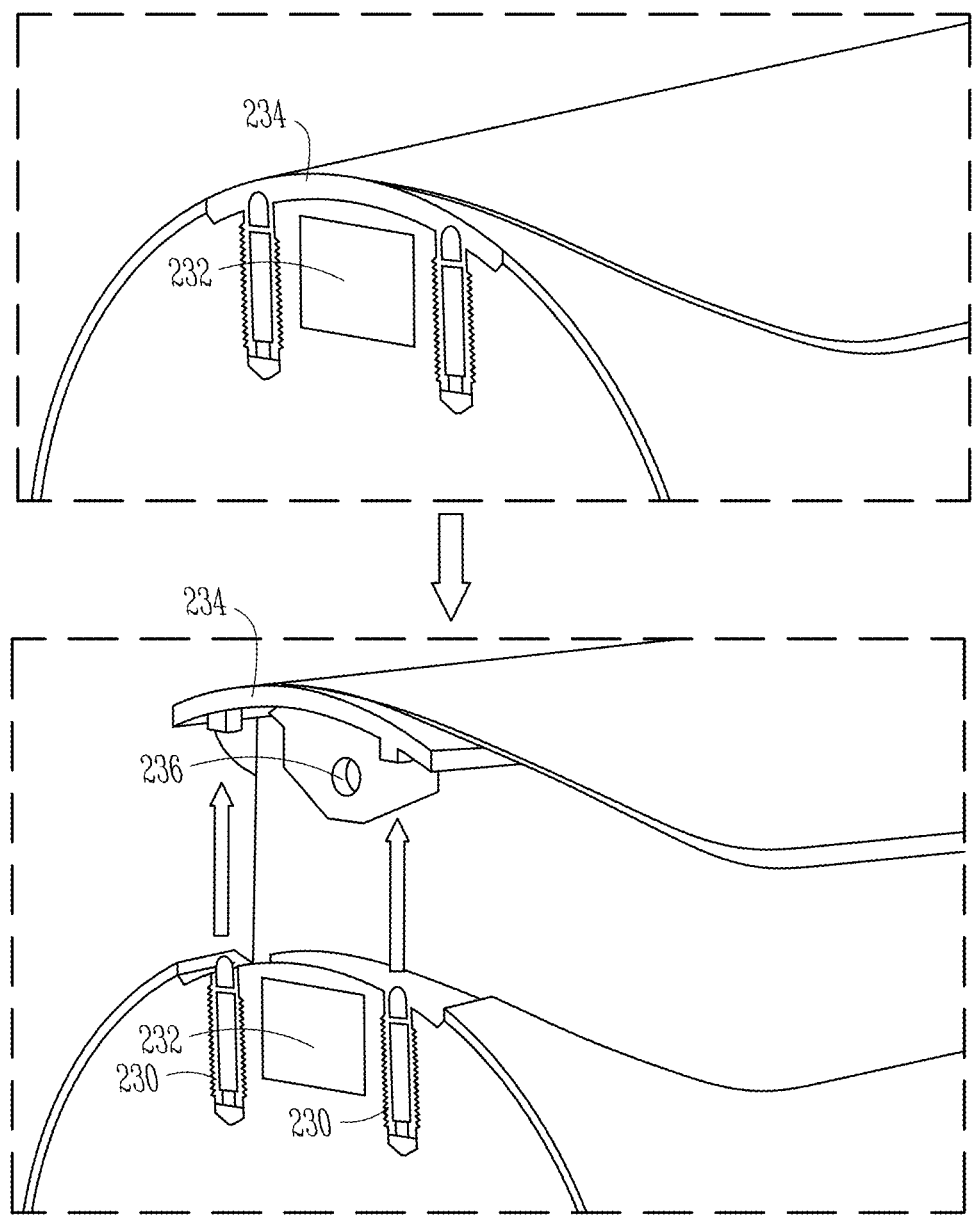

The present disclosure provides a payload module for an aerial vehicle that stores and deploys one or more submunition assemblies, which provide a portion of the vehicle's OML when stored, in a manner that preserves the aerodynamics of the aerial vehicle post-deployment. Pre-deployment a skin is aligned to a strongback such that the submunition assemblies are exposed through openings in the skin. Post-deployment, the skin rotates to cover any openings in the strongback exposed by the deployment of the submunition assemblies to restore the OML.

Referring now to FIGS. 1A-1D, 2A-2C and 3A-3B, an embodiment of missile 100 includes a propulsion module 102 having four fins 104 spaced at 90 degrees around the airframe, a payload module 106 including a pair of submunition assemblies 108 stored tip-to-tail and a guidance module 110. Each submunition assembly provides a conformal surface 111 that forms a portion of the airframe's exterior surface. Generally speaking, a "conformal surface" is one that matches the size and shape of the airframe, leaving the size and angle between corresponding curves unchanged. These submunition assemblies 108 pivot about an aft hinge point to deploy radially with respect to an axis 112 and are released from the airframe. The four fins 104 suitably have a rotational offset of 45 degrees with respect to the axis 112 and submunition assemblies 108 to reduce the chance of impact with the submunition assemblies as they clear the airframe.

Payload module 106 includes a strongback 114 having a cylindrical shape about axis 112. Strongback 114 includes a pair of axial openings 116 and 118 separated by panels 120 and 122. A skin 124 also having a cylindrical shape about axis 112 is positioned to rotate about strongback 114. An outer diameter of the strongback is typically at least 5 times a thickness of the skin. Skin 124 is relatively thin compared to the strongback. This allows mass to be allocated to the strongback to improve strength and rigidity of the payload module. Skin 124 includes a pair of axial openings 126 and 128 separated by panels 130 and 132. The axial openings 126 and 128 and the panels 130 and 132 each have sufficient surface area to cover the openings in the strongback. Pre-deployment, the submunition assemblies 108 are positioned in the openings 116 and 118 in the strongback and extend into the openings 126 and 128 level with skin 124 to complete an OML 134 of the airframe. Longitudinal edges 136 of the openings in the skin are configured to interface with longitudinal edges 138 of the submunition assembly's conformal surface 111 to provide a smooth OML 134. Rotation of the skin 124 is prevented by interference of skin 124 and the conformal surface 111 at this interface. Post-deployment and once the submunition assemblies clear the airframe, skin 124 rotates about the axis 112 relative to strongback 114 such that the skin's panels 130 and 132 are positioned to cover the openings 116 and 118 in strongback 114. The longitudinal edges 136 of the openings in the skin taper to exposed surfaces 140 of the strongback to complete OML 134.

In different embodiments, the submunition assemblies 108 and openings in the strongback and skin may be axial or radial as defined by a length/width ratio. The length being measured along the axis and the width across the axis. If the ratio is 1:1 or greater the opening is considered to be axial. In some embodiments the ratio is at least 2:1, 3:1 or even 20:1. If the ratio is less than 1:1 the opening is considered to be radial.

Referring now to FIGS. 4A-4B, 5A-5B and 6A-6C an embodiment of a payload module 200 includes a cylindrically-shaped skin 202 configured to rotate about a cylindrically-shaped strongback 204 oriented along an axis 206 via bearing assemblies 207 positioned at either end of the strongback. Strongback 204 includes a pair of axially-shaped openings 208 and 210 separated by panels 212 and 214. Skin 202 includes a pair of axially-shaped openings 216 and 218 separated by panels 220 and 222. The openings and panels in the skin have sufficient surface area to cover the openings in the strongback. A pair of submunition assemblies 224 and 226 are stowed tip-to-tail in the openings 208 and 210 in the strongback and extend into the openings 216 and 218 level with the skin. Each submunition assembly has a conformal surface 228 that forms part of the outer surface of the payload module 200 to complete the OML.

A deployment assembly is configured to deploy each submunition assembly through the aligned openings in the strongback and skin. Each deployment assembly includes a pair of slotted spring plungers 230 positioned and pre-biased to exert an outward force on the submunition assembly and a locking unit 232 to secure the submunition assembly. At deployment the locking unit 232 releases the submunition assembly and the pair of slotted spring plungers 230 exert the outward force on the submunition to deploy the submunition assembly through the aligned openings in the strongback and skin. Locking unit 232 includes a lock bracket 234 having a receptacle 236 on one end of the submunition assembly positioned forward in the opening in the strongback, a rod 238 positioned to move into and out of the receptacle and an actuator 240 configured to move the rod. The actuator may be a solenoid valve actuator in which current is applied and an EM field is generated through the coils, which pulls back the rod 238. When current is stopped, the rod is passively pushed forward. Each deployment assembly further includes a hinge bracket 242 positioned aft in the opening in the strongback and a pivot bracket 244 at one end of the submunition assembly below the conformal surface 228 positioned aft in the opening in the strongback to engage the hinge bracket 242. At deployment, the submunition assembly pivots radially outward away from the strongback and upon reaching a preset angle separates from the hinge bracket 242.

A rotation assembly is configured such that once the submunition assemblies clear the payload module, the rotation assembly rotates the skin 202 relative to the strongback 204 such that the skin's panels cover the openings in the strongback and the exposed surfaces of the strongback and the skin complete the OML. The rotation assembly including a pair of rotational springs 244 at opposite ends of the strongback 204 configured to pre-bias rotation of the skin 202 relative to the strongback and rotate the skin once the at least one submunition assembly clears the payload module.

In different embodiments, rotation of the skin is stopped via a hard stop or an equilibrium state of the rotational spring to align the skin's panel(s) to the opening(s) in the strongback to complete the OML.

Referring now to FIGS. 7A-7B, in an alternate embodiment, a payload module 700 includes a strongback 702 having four axially-shaped openings 704 separated by axially-shaped panels 706 and a rotational skin 708 having four axially-shaped openings 710 separated by axially-shaped panels 712. Pre-deployment, skin 708 is rotated to align its openings 710 to the openings 704 in the strongback. Submunition assemblies are positioned in the aligned openings within the strong back. Post-deployment of the submunition assemblies, skin 708 rotates such that its panels 712 cover the openings 704 in the strongback.

Figure 8:
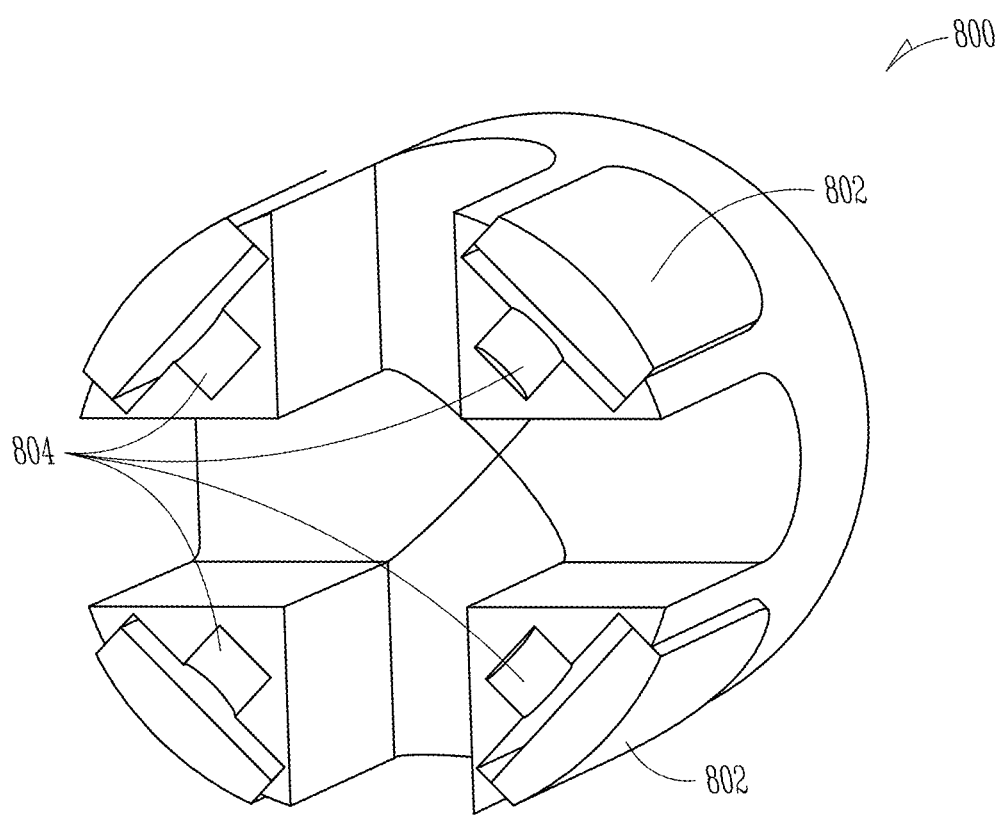
FIG. 8 illustrates an alternate embodiment of the payload module in which four axial panels of the strongback are biased to expand into the axial openings in the rotating skin post-deployment and rotation to form provide a smooth OML.

In the described embodiments post-deployment and subsequent rotation of the skin to cover the openings in the strongback, the skin and the portions of the strongback exposed through the openings in the skin complete the OML. The OML is not perfectly smooth in that it steps up and down between the surface of the skin and the exposed surfaces of the strongback. The step is equal to the thickness of the skin. In many applications this OML is adequate for aerodynamics of the vehicle post-deployment of the submunition assemblies. However, certain flight scenarios may require a smoother OML. Referring now to FIG. 8, a strongback 800 includes a number of panels 802 that are pre-biased with a like number of springs 804. Once post-deployment rotation is complete, panels 802 align to openings in the skin and are pushed out to become flush with the outer skin to complete a smooth OML.

In an alternate embodiment, the submunition assemblies do not pivot about a hinge point to deploy. An actuator such as a spring or other ejects the submunition assemblies radially through the openings in the skin. This is particularly viable at subsonic speeds and with radially-shaped submunitions.

As described the submunition assembly may be an individual submunition that provides the conformal surface or a container that houses a submunition and provides the conformal surface. At high deployment speeds e.g., supersonic, the use of a container to house and then release the submunition once it clears the aerial vehicle and enters free-fall can be advantageous to protect both the submunition and the vehicle.

Figure 9A:
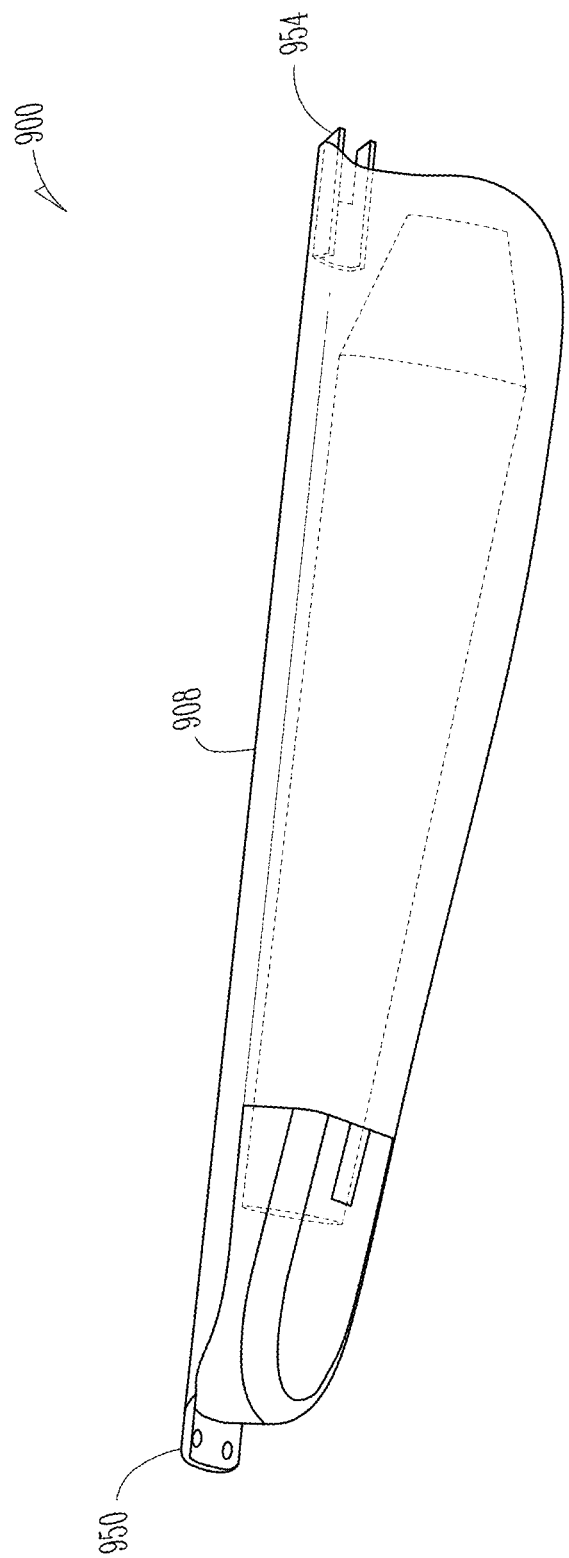
FIGS. 9A and 9B are perspective and exploded views of an embodiment of a submunition assembly in which a submunition is stored in a container and then released after deployment.
Figure 9B:
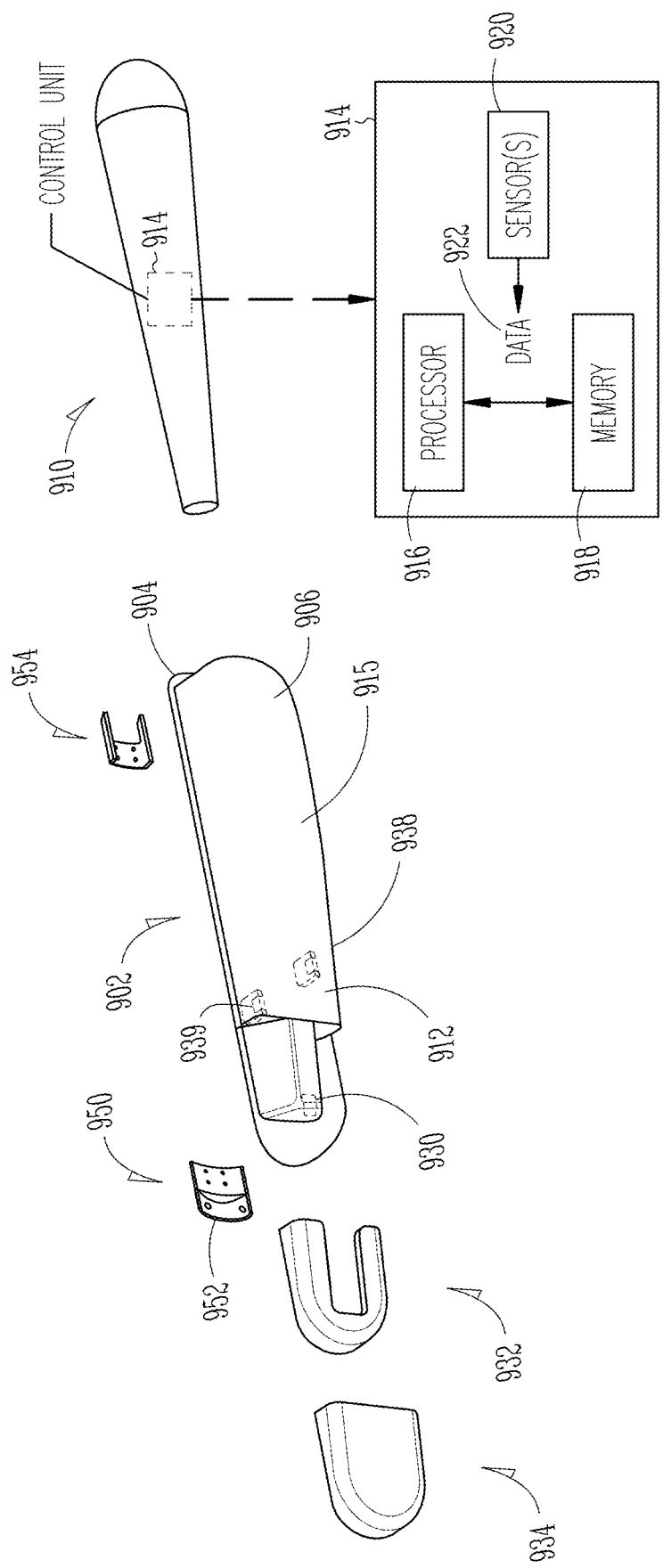
Figures 10A, 10B, 10C:
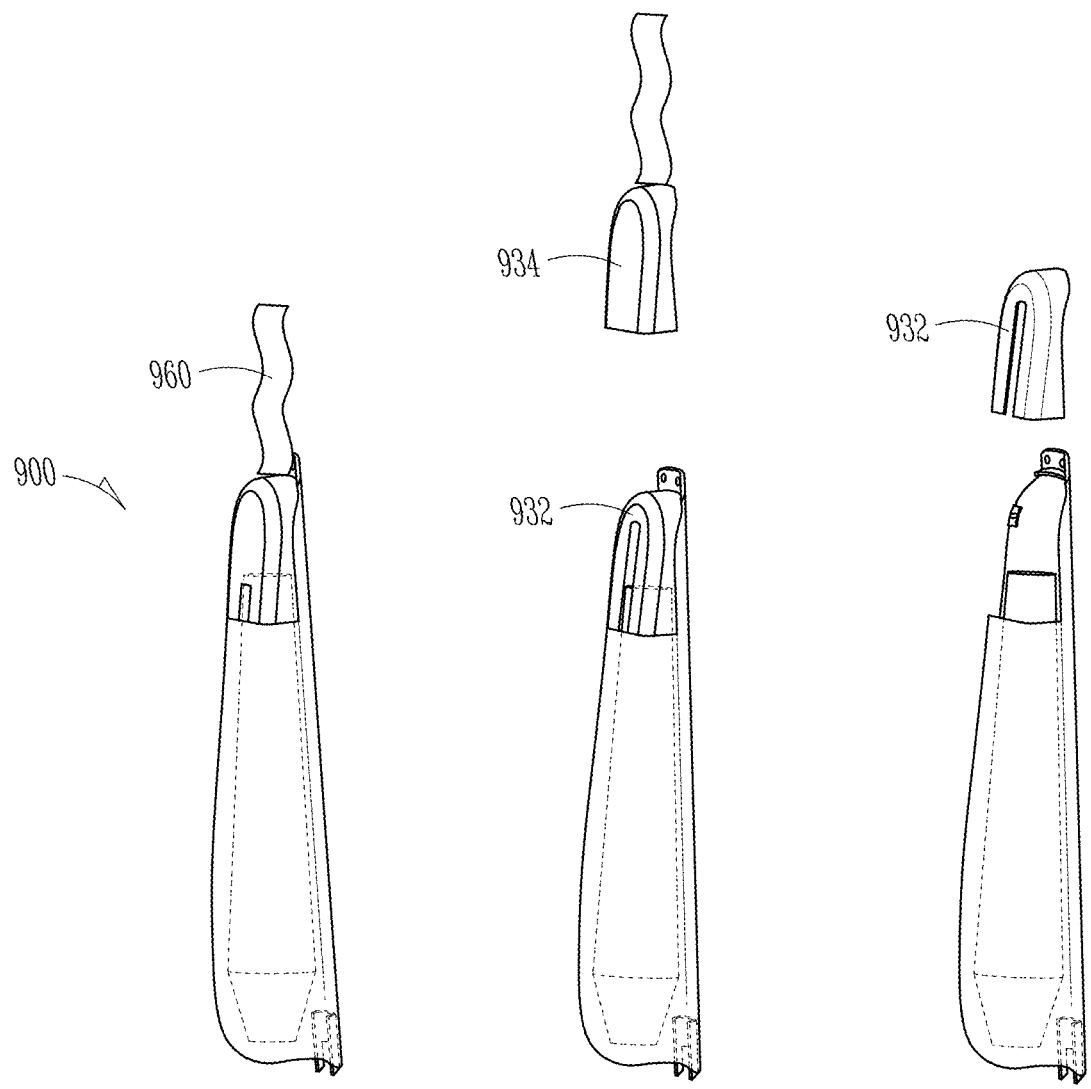
FIGS. 10A-10F illustrate an embodiment of a sequence for deploying the container and releasing the submunition.
Figure 10D:
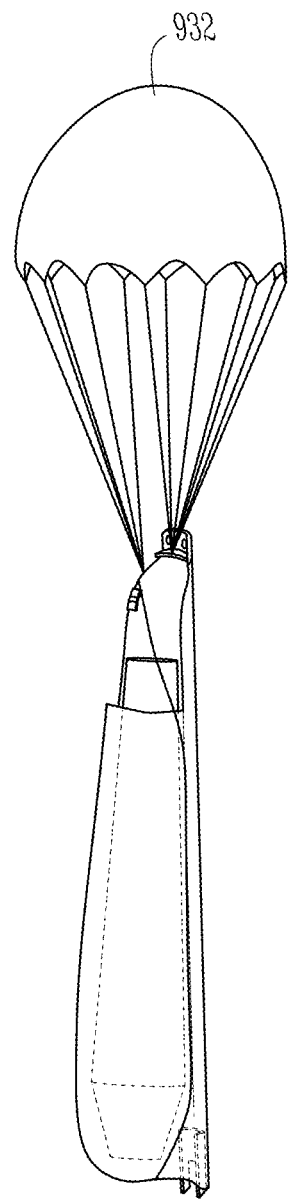
Figure 10E:
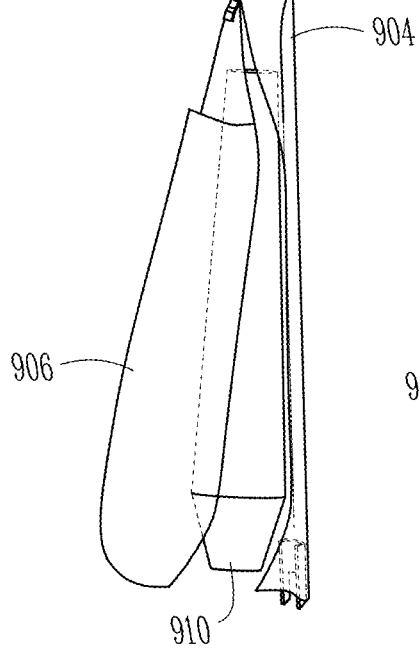
Figure 10F:
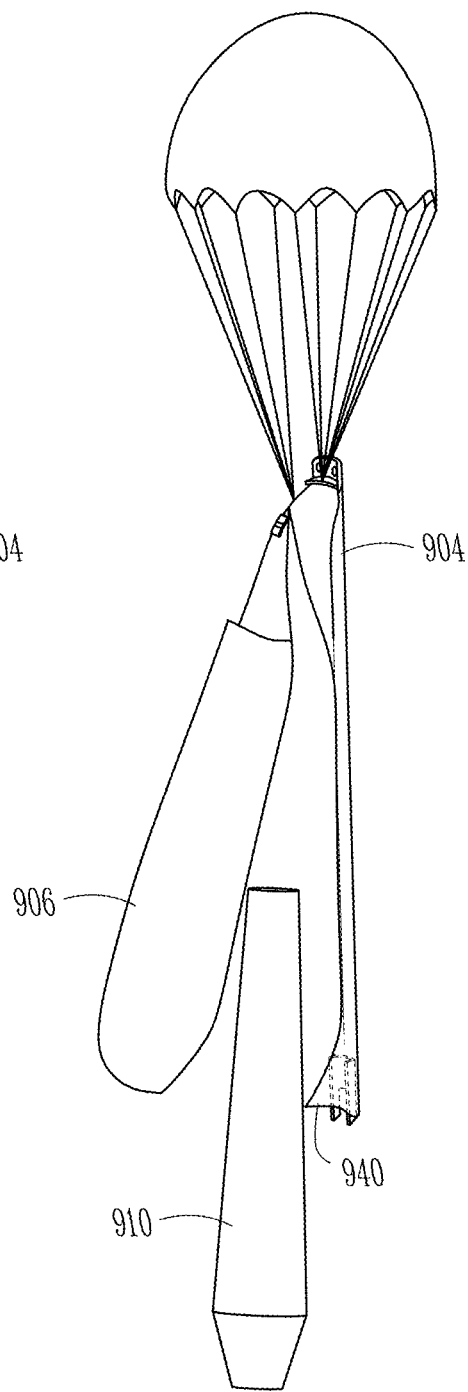

Referring now to FIGS. 9A-9B, an embodiment of a submunition assembly 900 includes a container 902 having separable first and second walls 904 and 906 that define a volume, at least a portion of one of the first and second walls have an exterior shape that provides the conformal surface 908 of the submunition assembly, a submunition 910 positioned within the volume inside the container; and a mechanism 912 (e.g., a latch) on the container to hold the first and second walls together to secure the volume and upon receipt of a command signal to separate the first and second walls to open the container and release the submunition. The exterior shape of the remaining portion of the container depends largely on the shape of submunition 910 and the volume inside the strongback. The exterior shape factors into the aerodynamics as the conformal container should be stable during separation and free-fall before releasing the submunition.

Container 902 provides environmental protection to the submunition 910 during separation and free-fall. The container volume may conform to the shape of the submunition 910. The volume may include padding or packing material 915 to absorb shock loads, and offer with environmental protection (thermal, water, air, dust, etc.).

Submunition 910 includes a control unit 914 configured to issue the command signal to actuator 938 to release mechanism 912 to open the container and release the submunition. Control unit includes a processor 916 and memory 918 and one or more sensor 920 (e.g., speed or altitude) to process data 922 to issue the command signal. The control unit is suitably hardwired to actuators in the container. Any and all processors, memory, sensors or data stored in memory or processed by the processor resides only with the submunition. Consequently, when the container falls away there is nothing of value to recover.

The container is axially-shaped having a length/width ratio of at least 1:1 and suitably at least 3:1. The walls joined at one end by a hinge 930 that defines the volume along an axis perpendicular to the hinge. A parachute 932 is stored in a rigid U-shaped parachute panel 934 positioned around the hinge 930 at one end of the container. Upon receipt of a parachute command from the submunition's control unit, an actuator 939 separate the parachute panel 934 from the container and allow the parachute 932 to deploy to slow the submunition assembly during free-fall. Upon receipt of the release command, the mechanism 912 and actuator 938 unlocks the walls allowing them to pivot about the hinge 930 to separate and release the submunition. The ends of the walls within the volume and opposite the hinge are suitably provided with wedges 940 that are engaged by the submunition under the force of gravity to assist with opening of the container.

To store and deploy submunition 910 from an airframe, container 902 includes a lock bracket 950 having a receptacle 952 and a pivot bracket 954 positioned at opposing ends of the container to receive a rod on the airframe and to engage a complementary hinge bracket positioned aft in the axial opening of the airframe. To initiate deployment the rod is retracted and the container pivots away from the airframe and is released to free-fall.

Referring now to FIGS. 10A-10F, once deployed from the airframe and payload module, a streamer 960 is deployed to orient the submunition assembly 900 during free-fall. At a determined speed or altitude, the submunition's control unit issues the parachute command that commands the actuators to separate the parachute panel 934 allowing the parachute 932 to deploy and open. At a determined speed or altitude, the submunition's control unit issues the release command that commands the actuators to allow the walls to open. Under the force of gravity, the submunition 910 pushes apart the walls opposite the hinge, assisted by the wedges, to separate from container 902.

While several illustrative embodiments of the disclosure have been shown and described, numerous variations and alternate embodiments will occur to those skilled in the art. Such variations and alternate embodiments are contemplated and can be made without departing from the spirit and scope of the disclosure as defined in the appended claims.

We claim:

1. A payload module for use with an aerial vehicle, the payload module comprising:
    a strongback having a cylindrical shape about an axis, said strongback having at least one opening formed therein;
    at least one submunition assembly positioned inside the strongback within the at least one opening, each said submunition assembly having a conformal surface;
    a skin having a cylindrical shape about the axis, said skin having at least one opening and at least one panel formed therein, each of said at least one opening and said at least one panel having sufficient area to cover the at least one opening in the strongback;
    a bearing assembly configured to allow for rotation of the skin relative to the strongback about the axis;
    wherein pre-deployment the skin is aligned such that the at least one opening in the strongback and the conformal surface of the submunition positioned therein are exposed through the at least one opening in the skin such that the skin and conformal surface of the submunition assembly complete an outer mold line (OML);
    a deployment assembly configured to deploy the at least one submunition assembly through the aligned openings in the strongback and skin, and
    a rotation assembly configured such that once the at least one submunition assembly clears the payload module, the rotation assembly rotates the skin relative to the strongback such that the at least one panel covers the at least one opening in the strongback and exposed surfaces of the strongback and the skin complete the OML.

2. The payload module of claim 1, wherein the submunition has a length/width ratio of at least 1:1 where length is measured along the axis.

3. The payload module of claim 1, wherein the length/width ratio is at least 2:1.

4. The payload module of claim 1, wherein the conformal surface of the at least one submunition assembly extends through the at least one opening in the strongback into the at least one opening in the skin and level with the skin to complete the OML.

5. The payload module of claim 4, wherein pre-deployment rotation is prevented by interference of the skin with the conformal surface of the at least one submunition assembly.

6. The payload module of claim 4, wherein longitudinal edges of the at least one opening in the skin are configured to interface with the conformal surface of the submunition assembly to complete the OML pre-deployment and to taper to the strongback post-deployment to complete the OML.

7. The payload module of claim 1, wherein an outer diameter of the strongback is at least 5 times a thickness of the skin.

8. The payload module of claim 1, wherein at least one panel of the strongback is pre-biased with a spring force such that post-deployment and rotation of the skin, the at least one panel moves outward into the at least one opening in the skin to complete the OML.

9. The payload module of claim 1,
    wherein the deployment assembly includes at least one spring per submunition assembly positioned and pre-biased to exert an outward force on the submunition assembly and a locking unit to secure the submunition assembly, wherein at deployment the locking unit releases the submunition assembly and the spring exerts the outward force on the submunition to deploy the submunition assembly through the aligned openings in the strongback and skin, and
    wherein the rotation assembly includes a rotational spring configured to pre-bias rotation of the skin relative to the strongback and rotate the skin once the at least one submunition assembly clears the payload module.

10. The payload module of claim 9, wherein the locking unit comprises:
    a lock bracket on one end of the submunition assembly positioned forward in the opening in the strongback, said lock bracket including a receptacle;

a rod positioned to move into and out of the receptacle; and an actuator configured to move the rod.

11. The payload module of claim 9, wherein the deployment assembly comprises:
   a hinge bracket positioned aft in the opening in the strongback;
   a pivot bracket at one end of the submunition assembly below the conformal surface positioned aft in the opening in the strongback to engage the hinge bracket,
   wherein at deployment, submunition assembly pivots radially outward away from the strongback and separates from the hinge bracket.

12. The payload module of claim 1, wherein the at least one submunition assembly comprises:
   a container having separable first and second walls that define a volume, at least a portion of one of the first and second walls have an exterior shape that provides the conformal surface of the submunition assembly;
   a submunition positioned within the volume inside the container; and
   a mechanism on the container to hold the first and second walls together to secure the volume and upon receipt of a command signal to separate the first and second walls to open the container and release the submunition.

13. The payload module of claim 12, wherein said submunition comprising a control unit configured to issue the command signal to the mechanism to open the container and release the submunition.

14. The payload module of claim 13, wherein the control unit includes a processor and memory to process data to issue the command signal, wherein any and all processors or memory or data stored in memory or processed by the processor resides only with the submunition.

15. A payload module for use with an aerial vehicle, the payload module comprising:
   a strongback having a cylindrical shape about an axis, said strongback having at least one opening formed therein;
   at least one submunition assembly positioned inside the strongback within the at least one opening, each said submunition assembly having a conformal surface,
   a skin having a cylindrical shape about the axis, said skin having at least one opening and at least one panel formed therein, each of said at least one opening and said at least one panel having sufficient area to cover the at least one opening in the strongback;
   a bearing assembly configured to allow for rotation of the skin relative to the strongback about the axis;
   wherein pre-deployment the skin is aligned such that the at least one opening in the strongback and the conformal surface of the submunition positioned therein are exposed through the at least one opening in the skin such that the skin and conformal surface of the submunition assembly complete an outer mold line (OML);
   a deployment assembly including at least one spring per submunition assembly positioned and pre-biased to exert an outward force on the submunition assembly and at least one locking unit to secure the submunition assembly, wherein at deployment the locking unit releases the submunition assembly and the spring exerts the outward force on the submunition assembly to deploy the at least one submunition assembly through the aligned openings in the strongback and skin; and
   a rotation assembly including a rotational spring configured to pre-bias rotation of the skin relative to the strongback, pre-deployment rotation is prevented by interference of the skin with at least one of the submunition assembly's conformal surface,
   wherein once the at least one submunition assembly clears the payload module, the rotational spring rotates the skin relative to the strong back such that the at least one panel covers the at least one opening in the strongback and exposed surfaces of the strongback and the skin complete the OML.

16. The payload module of claim 15, wherein the deployment assembly comprises:
   at least one hinge bracket positioned aft in the at least one opening in the strongback;
   at least one pivot bracket at one end of the submunition assembly below the conformal surface positioned aft in the at least one opening in the strongback to engage the at least one hinge bracket,
   wherein at deployment, the spring exerts the outward force on the submunition assembly causing the submunition assembly to pivot radially outward away from the strongback and separate from the hinge bracket.

17. The payload module of claim 15, wherein the submunition assembly comprises:
   a container having separable first and second walls that define a volume, at least a portion of one of the first and second walls have an exterior shape that provides the conformal surface of the submunition assembly;
   a submunition positioned within the volume inside the container, said submunition including a control unit including a processor and memory configured to process data to issue a command signal to the mechanism to separate the first and second walls and open the container to release the submunition, wherein the control unit includes a processor and memory to process data to issue the command signal, wherein any and all processors or memory or data resides only with the submunition.

18. A payload module for use with an aerial vehicle, the payload module comprising:
   a strongback having a cylindrical shape about an axis, said strongback having at least one axial opening formed therein, said axial opening having a length parallel to the axis and a width such that a ratio of length/width is at least 2:1;
   at least one submunition assembly positioned inside the strongback within the at least one axial opening, said submunition assembly including a separable container having a conformal surface and at least one submunition positioned within the separable container, a skin having a cylindrical shape about the axis, said skin having at least one axial opening and at least one axial panel formed therein, each having sufficient area to cover the at least one axial opening in the strongback;
   a bearing assembly configured to allow for rotation of the skin relative to the strongback about the axis;
   wherein pre-deployment the skin is aligned such that the at least one axial opening in the strongback and the conformal surface of the submunition positioned therein are exposed through the at least one axial opening in the skin such that the skin and conformal surface of the submunition assembly complete an outer mold line (OML);
   a deployment assembly including at least one spring per submunition assembly positioned and pre-biased to exert an outward force on a forward portion of the submunition assembly and at least one locking unit to secure the submunition and a hinge per submunition assembly positioned aft on the separable container and the axial opening of the strong back, wherein at deployment the locking unit releases the submunition assembly and the spring exerts the outward force on the conformal container to pivot about the hinge and deploy the at least one submunition assembly, including the separable container, through the aligned openings in the strongback and skin; and a rotation assembly including a rotational spring configured to pre-bias rotation of the skin relative to the strongback, pre-deployment rotation is prevented by interference of the skin with at least one of the submunition assembly's conformal surface, wherein once the at least one submunition assembly clears the payload module, the rotation assembly rotates the skin relative to the strongback such that the at least one panel covers the at least one opening in the strongback and exposed surfaces of the strongback and the skin complete the OML.

19. The payload module of claim 18, wherein said submunition includes a control unit including a processor and memory configured to process data to issue a command signal to the mechanism to separate the container to release the submunition, wherein the control unit includes a processor and memory to process data to issue the command signal, wherein any and all processors or memory or data resides only with the submunition.

20. The payload module of claim 18, wherein the hinge comprises:

at least one hinge bracket positioned aft in the at least one opening in the strongback; and at least one pivot bracket at one end of the submunition assembly below the conformal surface positioned aft in the at least one opening in the strongback to engage the at least one hinge bracket.

* * * * *